(12) United States Patent
Johnson et al.

(10) Patent No.: US 11,433,726 B2
(45) Date of Patent: Sep. 6, 2022

(54) AIR SPRINGS AND METHODS FOR MAKING THE SAME

(71) Applicant: ILJIN USA Corporation, Novi, MI (US)

(72) Inventors: Ron J. Johnson, Phoenix, AZ (US); Angad Vasant Patil, Phoenix, AZ (US); Michael L. Crabtree, Arvada, CO (US); Jeremy Mercer, Farmington Hills, MI (US); Ken Casagrande, Commerce Township, MI (US); Young Chun Lee, Suwon-si (KR)

(73) Assignee: ILJIN USA Corporation, Novi, MI (US)

( * ) Notice: Subject to any disclaimer, the term of this patent is extended or adjusted under 35 U.S.C. 154(b) by 92 days.

(21) Appl. No.: 16/849,006

(22) Filed: Apr. 15, 2020

(65) Prior Publication Data

US 2020/0324600 A1 Oct. 15, 2020

Related U.S. Application Data

(60) Provisional application No. 62/833,863, filed on Apr. 15, 2019.

(51) Int. Cl.
*B60G 11/58* (2006.01)
*B29C 48/00* (2019.01)
(Continued)

(52) U.S. Cl.
CPC .......... *B60G 11/58* (2013.01); *B29C 48/0021* (2019.02); *B60G 11/48* (2013.01);
(Continued)

(58) Field of Classification Search
CPC ......... B60G 11/58; B60G 11/62; B60G 11/48; B60G 2206/81; B60G 2206/81012;
(Continued)

(56) References Cited

U.S. PATENT DOCUMENTS 4,712,776 A 12/1987 Geno et al.
6,068,250 A 5/2000 Hawkins et al.
(Continued)

FOREIGN PATENT DOCUMENTS

EP 2156068 A1 * 2/2010 ............. F16F 9/057
WO WO-2010019862 A1 * 2/2010 ............. B60G 11/27
(Continued)

OTHER PUBLICATIONS

Description translation for EP 2156068 from Espacenet (Year: 2010).*
(Continued)

*Primary Examiner* — Jonathan Ng
*Assistant Examiner* — Daniel M. Keck
(74) *Attorney, Agent, or Firm* — Dinsmore & Shohl LLP; Yongsok Choi, Esq.

(57) ABSTRACT

A method for forming an air spring for a vehicle including a frame coupled to the air spring includes heating an elastomeric base material to a melting point of the elastomeric base material, thereby forming a melted elastomeric base material, forming a sleeve from the melted elastomeric base material, the sleeve being substantially free of textile reinforcing fibers, and engaging the sleeve with end components, the sleeve and the end components defining a deformable pressure vessel, where the deformable pressure vessel supplies a supporting force.

23 Claims, 5 Drawing Sheets

(51) Int. Cl.
  *B60G 11/48* (2006.01)
  *B60G 11/62* (2006.01)
  *F16F 9/04* (2006.01)
  *F16F 13/00* (2006.01)
  *B29K 21/00* (2006.01)
  *B29L 31/30* (2006.01)

(52) U.S. Cl.
  CPC ............ *B60G 11/62* (2013.01); *F16F 9/0454* (2013.01); *F16F 13/002* (2013.01); *B29K 2021/003* (2013.01); *B29L 2031/30* (2013.01); *B60G 2202/152* (2013.01); *B60G 2206/42* (2013.01); *B60G 2206/70* (2013.01); *B60G 2206/73* (2013.01); *B60G 2206/81* (2013.01); *B60G 2206/8105* (2013.01); *B60G 2206/81012* (2013.01); *B60G 2206/82* (2013.01); *B60G 2206/8201* (2013.01); *F16F 2224/025* (2013.01); *F16F 2224/0208* (2013.01); *F16F 2226/04* (2013.01)

(58) Field of Classification Search
  CPC ........ B60G 2206/8105; B60G 2206/82; B60G 2206/8201; B60G 2206/70; B60G 2206/73; B60G 2202/152; B60G 2206/42; B60G 11/27; F16F 13/002; F16F 9/02; F16F 9/04; F16F 9/0454; F16F 2226/04; F16F 2224/0208; F16F 2224/025; F16F 2224/0241; B29C 48/001; B29C 48/0021; B29C 48/09; B29K 2021/003

See application file for complete search history.

(56) References Cited

U.S. PATENT DOCUMENTS

| | | | |
|---|---|---|---|
| 6,085,797 | A | 7/2000 | Grabaum et al. |
| 6,102,378 | A | 8/2000 | Gieseler et al. |
| 8,066,265 | B2 | 11/2011 | Leonard |
| 9,193,239 | B2 | 11/2015 | Willems |
| 9,352,632 | B2 | 5/2016 | Manninen et al. |
| 2006/0066015 | A1 | 3/2006 | Tubbs |
| 2018/0009283 | A1* | 1/2018 | Pniewski ............. F16F 9/3271 |
| 2018/0079274 | A1 | 3/2018 | Rose et al. |
| 2018/0195478 | A1* | 7/2018 | Iwa ......................... F16F 1/06 |
| 2020/0180006 | A1* | 6/2020 | Jerisk .................... B60G 15/14 |

FOREIGN PATENT DOCUMENTS

| | | | | |
|---|---|---|---|---|
| WO | WO-2013052930 | A2 * | 4/2013 | ............ B60G 15/12 |
| WO | WO-2017022604 | A1 * | 2/2017 | ............ F02M 59/44 |

OTHER PUBLICATIONS

International Search Report of PCT/US2020/028225 dated Jul. 20, 2020.

* cited by examiner

AIR SPRINGS AND METHODS FOR MAKING THE SAME

CROSS-REFERENCE TO RELATED APPLICATIONS

This application claims the benefit of U.S. Provisional Patent Application 62/833,863 filed Apr. 15, 2019 and entitled "Hybrid Elastomeric Air Spring," the contents of which are hereby incorporated by reference in their entirety.

BACKGROUND

Field

The present disclosure relates to air springs and methods for making the same. More particularly, the present disclosure relates to automotive air springs and methods for making automotive air springs.

Technical Background

Air springs are used in a variety of vehicular applications. As one example, air springs can be used to support seats in a vehicle to provide a comfortable ride for an occupant in the seat. In some applications, air springs may be utilized in the vehicle's suspension system. Air springs can assist in providing smooth and constant ride quality, and can be used in performance suspension systems.

For conventional air springs for a vehicle suspension system, the sleeve is made of deformable elastomeric material such as rubber. However, traditional elastomeric materials are unable to support high loads, and conventional air springs generally include textile reinforcing fibers to contain pressure and support loads placed on the air springs. However, incorporating textile reinforcing fibers into elastomeric material is time consuming and costly, thereby increasing manufacturing costs of conventional air springs. Moreover, the textile reinforcing fibers can contribute to hysteresis, thereby reducing the performance of the air spring. Further, dissimilar deformation of the materials of the air spring (e.g., the elastomeric material and the textile reinforcing fibers) can lead to shearing actions, which can lead to spring failure.

BRIEF SUMMARY

Accordingly, a need exists for improved air springs and improved methods for forming air spring sleeves. Embodiments of the present disclosure are directed to methods for forming air springs that include a sleeve that is substantially free of textile reinforcing fibers. By forming the air springs without the use of textile reinforcing fibers, the manufacture of the air springs can be simplified. Some embodiments described herein are directed to composite springs including a first spring that deforms in accordance with Hooke's law, and a second spring that deforms in accordance with Boyle's law (e.g., an air spring). Load on the composite spring can be distributed between the first spring and the second spring, such that pressures within the second spring (e.g., the air spring) can be reduced, thereby increasing the durability of the second spring. Moreover, the first spring and the second spring may provide redundancy, allowing the spring to support a load in the case of failure of one of the springs.

In one embodiment, a method for forming an air spring for a vehicle including a frame coupled to the air spring includes heating an elastomeric base material to a melting point of the elastomeric base material, thereby forming a melted elastomeric base material, forming a sleeve from the melted elastomeric base material, the sleeve being substantially free of textile reinforcing fibers, and engaging the sleeve with end components, the sleeve and the end components defining a deformable pressure vessel, where the deformable pressure vessel supplies a supporting force.

In another embodiment, a composite spring assembly for a vehicle includes a first spring that is structurally configured to deform according to Hooke's law, a second spring that is structurally configured to deform according to Boyle's law, where the second spring is positioned in parallel with the first spring, and where the second spring includes a sleeve that is substantially free of textile reinforcing fibers, and end components engaged with the sleeve, the sleeve and the end components defining a deformable pressure vessel.

In yet another embodiment, a method for forming a composite spring assembly for a vehicle includes coupling end components to a sleeve, the end components and the sleeve defining a deformable pressure vessel of a second spring, and positioning a first spring and the second spring in parallel, where the first spring is structurally configured to deform according to Hooke's law and the second spring is structurally configured to deform according to Boyle's law.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to spring assemblies including air springs. In some embodiments, the air springs may be substantially free of textile reinforcing fibers, thereby decreasing the cost of manufacturing the air spring as well as increasing the durability and performance of the air spring. In some embodiments, the air springs are positioned in parallel with a spring that deforms in accordance with Hooke's law. In these embodiments, pressures within the air spring can be reduced, and the air spring and Hooke's law spring may provide redundancy in the case of the failure of one of the air spring or the Hooke's law spring. These and other embodiments will now be described with reference to the appended drawings.

As referred to herein, the vertical vehicle direction, the vertical seat direction, and the vertical seat direction generally refer to the upward-downward directions of the vehicle, seat, and springs described herein (e.g., the +/−Z-direction as depicted), respectively. The vertical vehicle direction, the vertical seat direction, and the vertical spring direction may or may not be parallel with one another, depending on the relative orientation of the vehicle, the seat, and the springs described herein.

Figure 1:
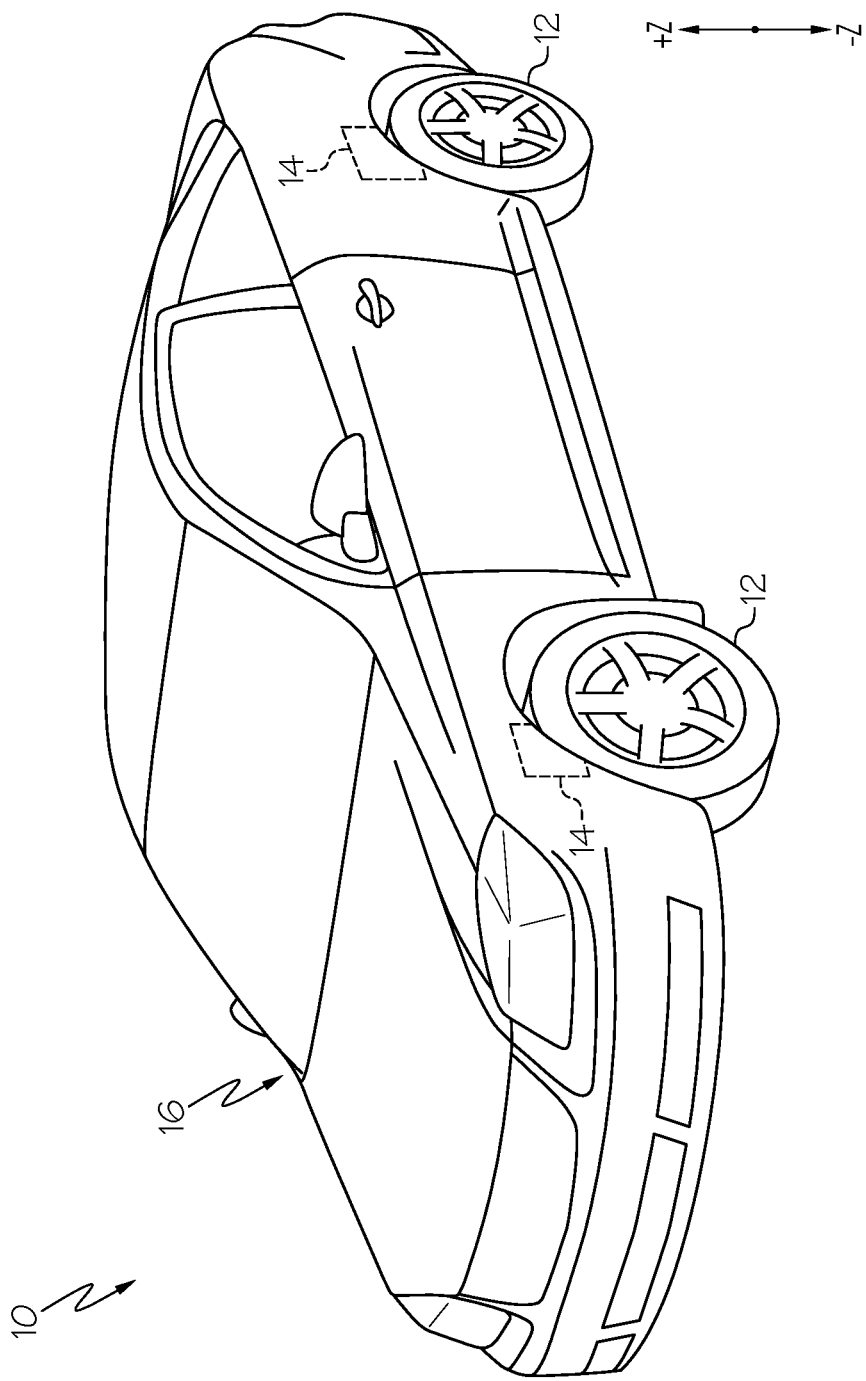
FIG. 1 schematically depicts a perspective view of a vehicle including suspension assemblies, according to one or more embodiments shown and described herein.

Now referring to FIG. 1, a perspective view of a vehicle 10 is schematically depicted. In embodiments, the vehicle 10 may include any suitable vehicle for transporting people and/or goods, and may include, for example and without limitation, an automobile, a truck or the like. While in the embodiment depicted in FIG. 1 the vehicle 10 depicts an automobile, in some embodiments, the vehicle 10 may include a support device or other vehicle, such as a wheelchair or the like.

In embodiments, the vehicle 10 includes one or more wheels 12 that are coupled to a frame 16 of the vehicle 10. For example, the wheels 12 may be coupled to the frame 16 of the vehicle 10 by one or more suspension assemblies 14. The suspension assemblies 14 may permit movement of the wheels 12 with respect to the frame 16 of the vehicle 10, for example in a vertical vehicle direction (e.g., in the +/−Z-direction as depicted), thereby absorbing impact that may result from the vehicle 10 traversing uneven terrain. Vertical movement of the wheels 12 with respect to the frame 16 of the vehicle 10 may also influence the responsiveness of the vehicle 10, for example, as the vehicle 10 turns in one direction or the other.

Figure 2:
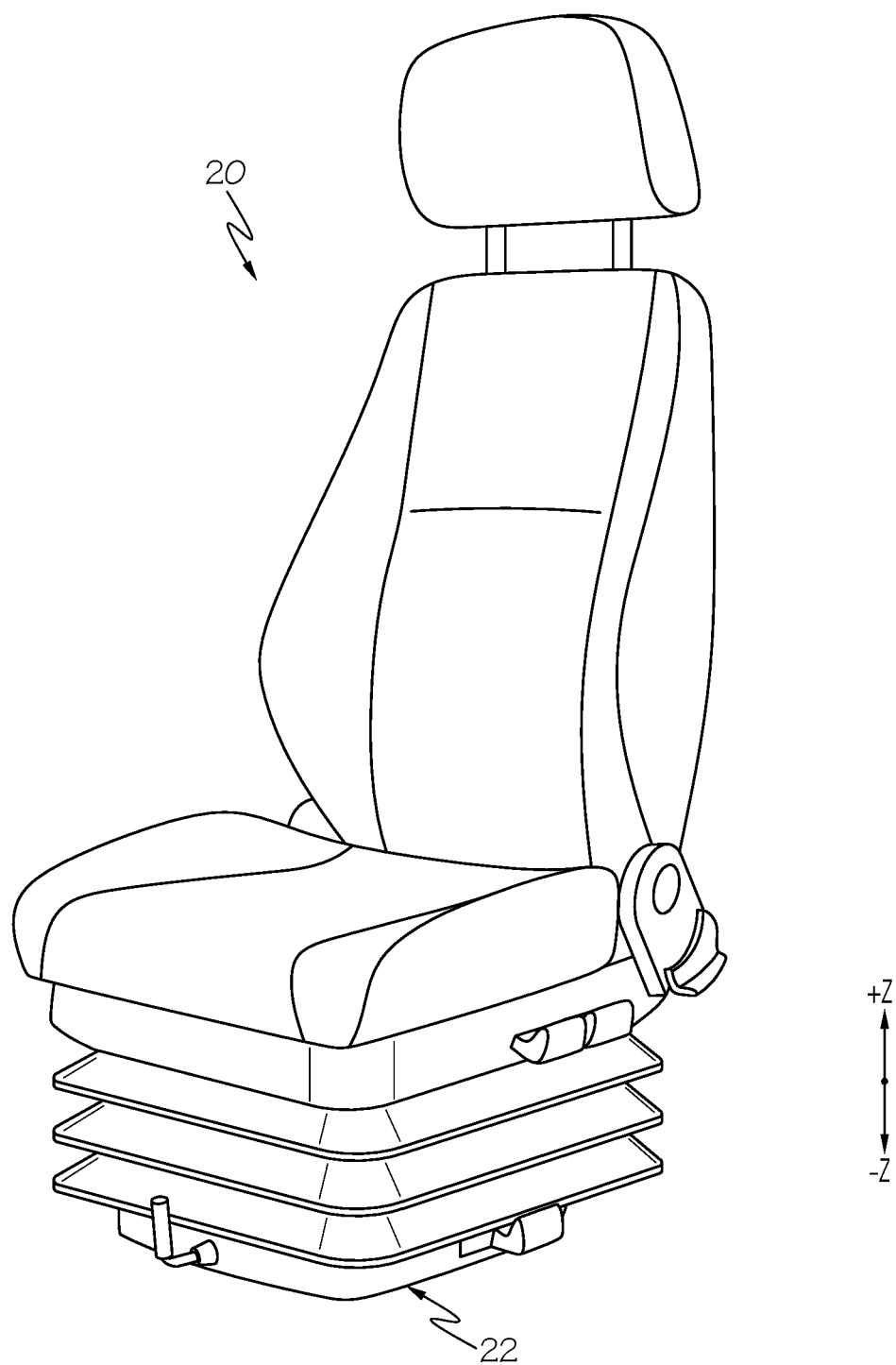
FIG. 2 schematically depicts a perspective view of a suspended seat including a seat suspension, according to one or more embodiments shown and described herein.

Referring to FIG. 2, a perspective view of a seat assembly 20 is schematically depicted. A person, such as a passenger or driver, may sit in the seat assembly 20 while the vehicle 10 (FIG. 1) is in motion. In embodiments, the seat assembly 20 may be coupled to the frame 16 (FIG. 1) of the vehicle 10 (FIG. 1), and in some embodiments, the seat assembly 20 may be coupled to the frame 16 of the vehicle 10 through a seat suspension 22. The seat suspension 22 may generally permit vertical movement of the seat assembly 20 with respect to the frame 16 (FIG. 1) of the vehicle 10 (FIG. 1). Vertical movement of the seat assembly 20 in a vertical seat direction (e.g., in the +/−Z-direction as depicted) with respect to the frame 16 (FIG. 1) of the vehicle 10 (FIG. 1) may also absorb impact that may result from the vehicle 10 traversing uneven terrain, preventing the impact from being transmitted to a person in the seat assembly 20.

Figure 3:
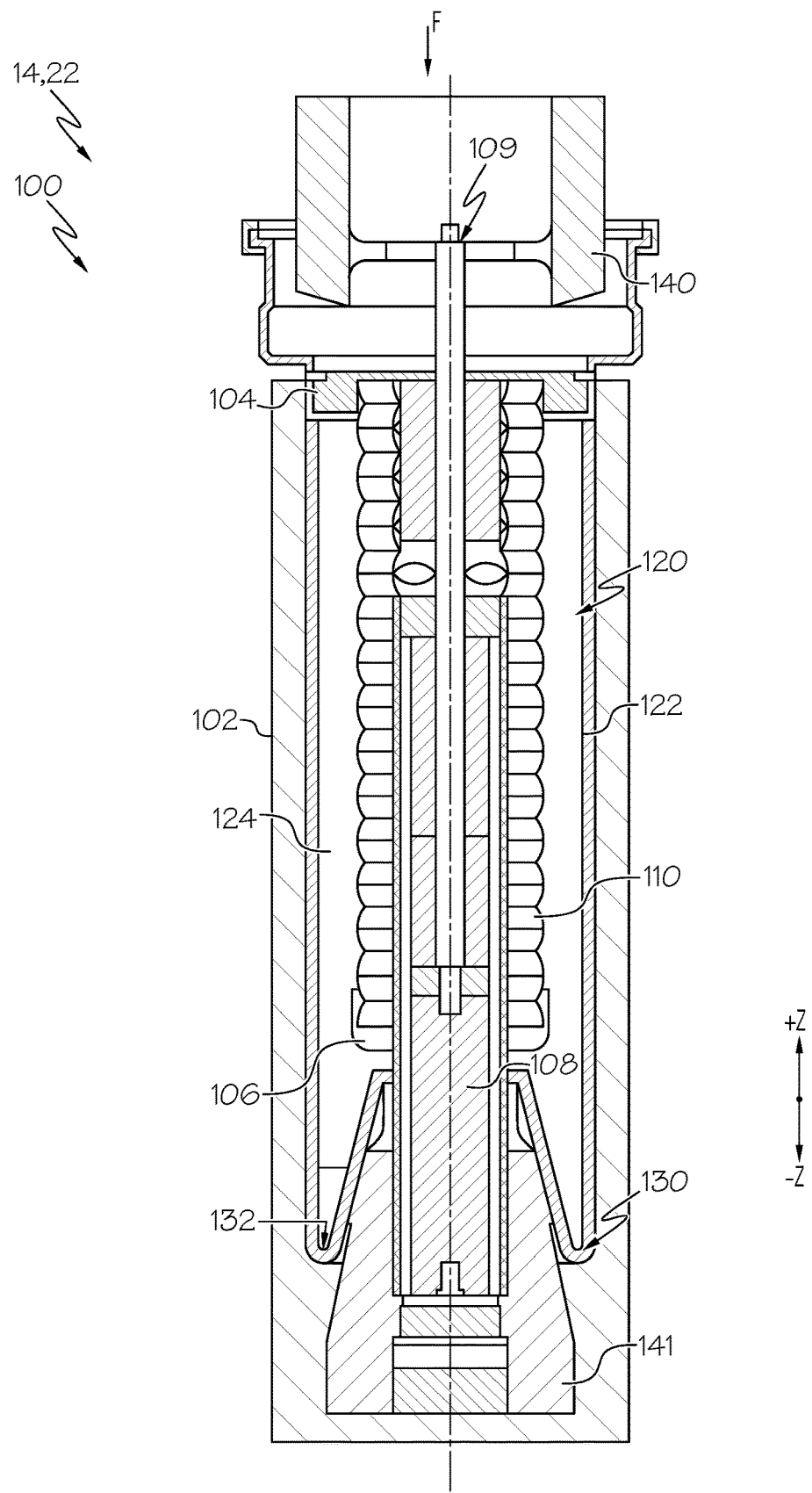
FIG. 3 schematically depicts a section view of a spring assembly of the suspension assembly of FIG. 1 and/or the seat suspension of FIG. 2, according to one or more embodiments shown and described herein.

Referring to FIG. 3, a section view of a spring assembly 100 is schematically depicted. In embodiments, the features of the spring assembly 100 may be incorporated into the suspension assembly 14 (FIG. 1) and/or the seat suspension 22 (FIG. 2). In embodiments, the spring assembly 100 generally includes a restraining cylinder 102, and one or more springs positioned within the restraining cylinder 102. In some embodiments, the spring assembly 100 further includes a damper 108 including a damper piston 109.

For example, in the embodiment depicted in FIG. 3, the spring assembly 100 is a composite spring assembly including a first spring 110 and a second spring 120. In embodiments, the first spring 110 is structurally configured to deform according to Hooke's law. For example, within an operable range of elastic deformation, a force required to compress or extend the first spring 110 has a linear relationship with a distance the first spring 110 is extended or compressed. In embodiments, the first spring 110 may include a wave spring, a coil spring, a Belleville spring, a rubber spring or the like, and the first spring 110 may be formed of any suitable material including one or more metals or non-metallic materials.

Figure 4:
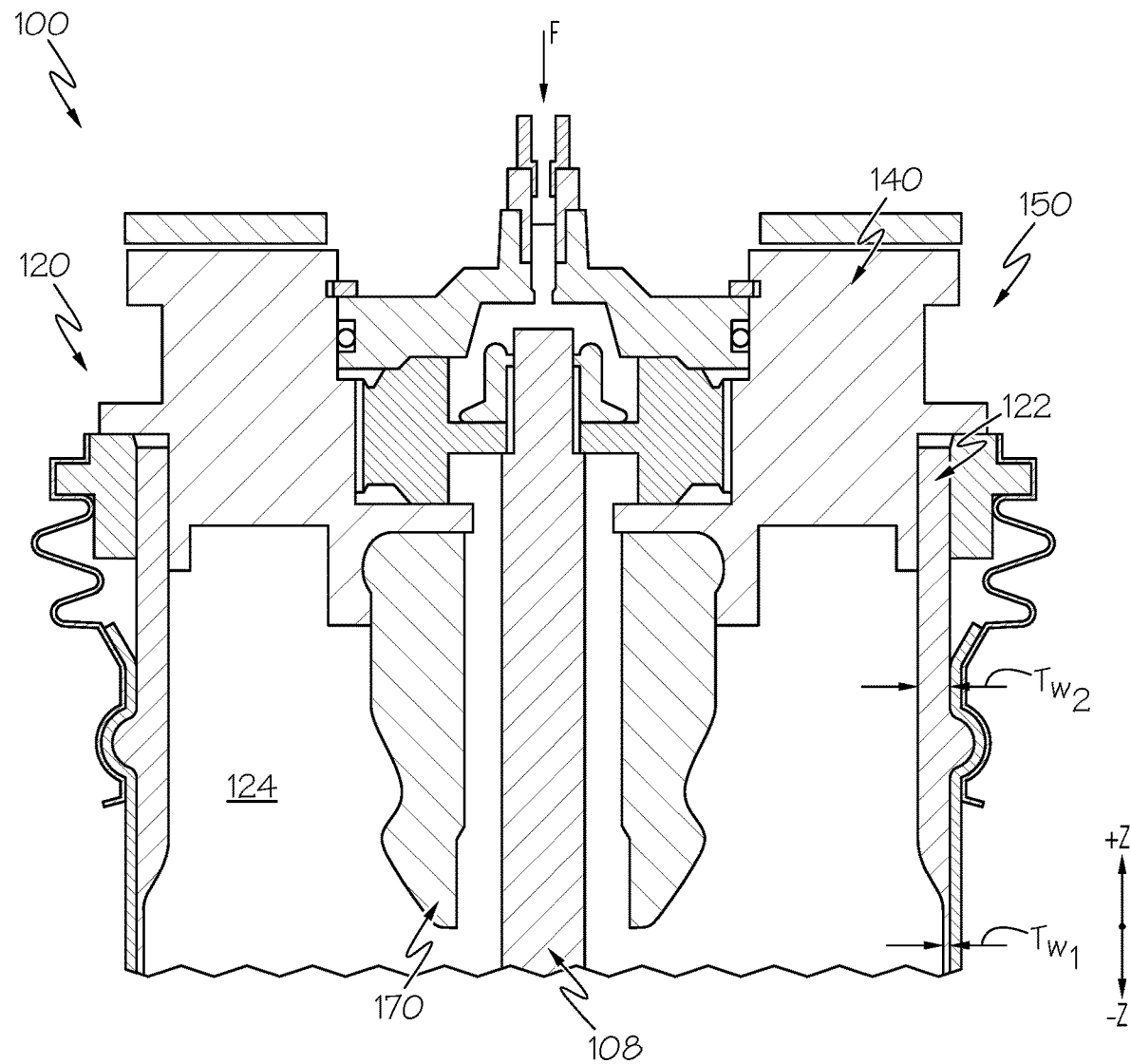
FIG. 4 schematically depicts an enlarged section view of a composite spring assembly, according to one or more embodiments shown and described herein.

Referring to FIG. 4, an enlarged section view of a spring assembly 100 is depicted. In embodiments, the second spring 120 includes a sleeve 122 that engaged with and/or coupled to one or more end component 140, 141. In some embodiments, the end components 140 and 141 and the sleeve 122 define a deformable pressure vessel 150. For example, in some embodiments, the sleeve 122 and the end components 140 and 141 defines an interior chamber 124 that may be filled with a fluid, such as air or another suitable gas or combination of gases. The second spring 120, in embodiments, is structurally configured do deform according to Boyle's law, within practical tolerances. For example, as the second spring 120 is compressed, the volume of the interior chamber 124 may decrease, thereby increasing the pressure of the fluid within the interior chamber 124 in general accordance with Boyle's law. It should be understood that under normal conditions, differences between the behavior of the fluid in the interior chamber 124 and the behavior of ideal gas may cause the compression of the second spring 120 to deviate from strict adherence to Boyle's law, and the term "practical tolerances" is meant to identify deviations between ideal gas behavior and the behavior of fluids suitable for use in air springs (e.g., air).

In some embodiments, the sleeve 122 defines a lobe 130, such that the deformable pressure vessel 150 is a rolling lobe spring. However, it should be understood that this is merely an example, and the deformable pressure vessel 150 may include any suitable construction.

Referring particularly to FIG. 4, in some embodiments, a wall thickness Tw of the sleeve 122 may vary moving along the sleeve 122 in a vertical spring direction (e.g., in the +/−Z-direction as depicted). For example, in the embodiment depicted in FIG. 4, the sleeve 122 has a first wall thickness $Tw_1$ at a first location, and a second wall thickness $Tw_2$ at a second location that vertically spaced apart from the first location, where the first wall thickness $Tw_1$ is different from the second wall thickness $Tw_2$. In the embodiment depicted in FIG. 4, the first wall thickness $Tw_1$ is less than the second wall thickness $Tw_2$. Variation of the wall thickness Tw of the sleeve 122 may assist in preferential deformation of the sleeve 122 when the spring assembly 100 is compressed.

In some embodiments, the sleeve 122 and/or the end components 140 and 141 are substantially free of textile reinforcing fibers, and in some embodiments, sleeve 122 and/or the end components 140 and 141 may be formed from elastomeric materials, such as thermoplastic or thermoset elastomer or the like. In embodiments, the sleeve 122 and/or the end components 140 and 141 may be formed through any suitable process, including but not limited to injection molding, blow molding, insert molding, spin molding, extrusion, or the like.

Because the sleeve 122 and/or the end components 140 and 141 are substantially free of textile reinforcing fibers, in some embodiments, the end components 140 and 141 may be co-molded to the sleeve 122. For example, in some embodiments, the end components 140 and 141 may be bonded to sleeve 122 in a co-molding process such that the end components 140 and 141 and the sleeve 122 are monolithic. By co-molding the end components 140 and 141 to the sleeve 122, manufacturing complexity can be reduced as compared to conventional air springs that include crimp connections. Moreover, by forming the sleeve 122 and the end components 140 and 141 to be monolithic, the likelihood of adhesive failure at a junction between the sleeve 122 and the end components 140 and 141 can be reduced. In some embodiments, the end components 140 and 141 can be sealed to the sleeve 122 through mechanical coupling or chemical coupling, for example, a structural adhesive, a crimp connection, an interference fit connection, a bead connection, a bonded connection, a welded connection, layer bonding, or the like.

Further and referring collectively to FIGS. 3 and 4, in embodiments in which the sleeve 122 and/or the end components 140 and 141 are substantially free of textile reinforcing fibers, different geometries of the lobe 130 may be realized. For example, the lobe 130 may define a lobe radius 132 as shown in FIG. 3. In conventional configurations, the geometry of the lobe radius 132 may be restricted by material constraints of textile reinforcing fibers. In particular, the lobe radius 132 may need to be comparatively large to allow textile reinforcing fibers positioned within the sleeve 122 to bend around the lobe 130. However, in embodiments in which the sleeve 122 is substantially free of textile reinforcing fibers, comparatively smaller lobe radii 132 may be realized, thereby allowing the geometry of the lobe 130 to be tailored to achieve desired preferential deformation of the sleeve 122 during compression.

Moreover, because the sleeve 122 is substantially free of textile reinforcing fibers, hysteresis of the second spring 120 may be reduced as compared to conventional air springs. More particularly, friction between the rubber and textile reinforcing fibers of conventional air springs may contribute to hysteresis of conventional air springs, and accordingly by having the sleeve 122 substantially free of textile reinforcing fibers, hysteresis of the second spring 120 can be reduced, thereby reducing harshness. Further, dissimilar deformation between textile reinforcing fibers and rubber of conventional air springs can lead to noise and vibration. Accordingly, by forming the sleeve 122 to be substantially free of textile reinforcing fibers, the second spring 120 may have less noise and/or vibration as compared to conventional air springs. Dissimilar deformation between textile reinforcing fibers and rubber of conventional air springs can also lead to shearing actions, which can reduce the durability of conventional air springs and lead to premature failure of the air springs. Accordingly, durability of the second spring 120 may increase as compared to conventional air springs because the sleeve 122 is substantially free of textile reinforcing fibers.

While the embodiment depicted in FIGS. 3 and 4 include both the first spring 110 and the second spring 120, it should be understood that in some embodiments, the spring assembly 100 may include only one of the first spring 110 and the second spring 120. For example, in some embodiments, the spring assembly 100 may include only the second spring 120. In embodiments that only include the second spring 120, the second spring 120 may be structurally configured to support the entire load of a force F applied to the spring assembly 100. For example, in some embodiments, the second spring 120 includes has a supporting force that can oppose a load force F between about 0 kilograms-force and about 50,000 kilograms-force, inclusive of the endpoints, without failure of the second spring 120. In some embodiments, the second spring 120 has a supporting force that can oppose a load force F of at least about 10 kilograms-force without failure of the second spring 120. In these embodiments, the spring assembly 100 may be utilized to support the seat assembly 20 (FIG. 2) and may generally support the weight of a person sitting in the seat assembly 20.

In some embodiments, the second spring 120 has a supporting force that can oppose a load force F of at least about 100 kilograms-force without failure of the second spring 120. In some embodiments, the second spring 120 has a supporting force that can oppose a load force F of at least about 600 kilograms-force without failure of the second spring 120. In some embodiments, the second spring 120 has a supporting force that can oppose a load force F of at least about 1000 kilograms-force without failure of the second spring 120. In some embodiments, the second spring 120 has a supporting force that can oppose a load force F of at least about 5000 kilograms-force without failure of the second spring 120. In some embodiments, the second spring 120 has a supporting force that can oppose a load force F of at least about 10,000 kilograms-force without failure of the second spring 120. In some embodiments, the second spring 120 has a supporting force that can oppose a load force F of at least about 25,000 kilograms-force without failure of the second spring 120. In some embodiments, the second spring 12 has a supporting force that can oppose a load force F of greater than about 50,000 kilograms-force without failure of the second spring 120. In these embodiments, the spring assembly 100 may be utilized to support the vehicle 10 (FIG. 1) and may generally support a portion of the weight of the vehicle 10.

In embodiments including both the first spring 110 and the second spring 120, the first spring 110 and the second spring 120 are positioned in parallel to one another. For example, in the embodiment depicted in FIG. 3, the first spring 110 and the second spring 120 are engaged with one another through an upper spring seat 104 and a lower spring seat 106. As referred to herein, "parallel" positioning of the first spring 110 and the second spring 120 means that when the load force F is applied to the spring assembly 100, the load force F is simultaneously applied to and distributed between the first spring 110 and the second spring 120. Furthermore, the first spring 110 and the second spring 120 may be positioned such that the load force F is simultaneously applied to and distributed between the first spring 110 and the second spring 120 across the range of compression of the spring assembly 100. For example, the first spring 110 and the second spring 120 may have the same or similar compressive ranges. Parallel positioning of the first spring 110 and the second spring 120 is distinguishable from "series" positioning of springs, in which force is applied to a first spring, and then the force is sequentially transferred to a second spring through the first spring. While in the embodiment depicted in FIG. 3, the first spring 110 is positioned radially within the second spring 120, it should be understood that this is merely an example, and in some embodiments, the first spring 110 may be positioned around the second spring 120.

In embodiments, a load of the first spring 110 may be comparatively low as compared to conventional spring assemblies with a single spring. In particular, because load on the spring assembly 100 can be distributed between the first spring 110 and the second spring 120, the load of the first spring 110 need not be selected to be so high so as to support the entire load of the load force F. Accordingly, in some embodiments, the first spring 110 may be formed from a comparatively soft material, such as a non-metallic material. Furthermore, because the load on the spring assembly 100 can be distributed between the first spring 110 and the second spring 120, the pressure of fluid (e.g., air) within the interior chamber 124 of the second spring 120 can be maintained at a lower pressure as compared to a conventional air spring supporting a similar load. By maintaining the second spring 120 at a lower pressure as compared to a conventional air spring, stress on the sleeve 122 resulting from the pressure of fluid (e.g., air) within the interior chamber 124 may be reduced, thereby reducing the likelihood of failure at the sleeve 122. Further, the size of actuators and/or pumps that maintain the pressure of fluid (e.g., air) within the interior chamber 124 can be reduced, thereby reducing the weight of the spring assembly 100 and reducing the energy necessary to support operation of the spring assembly 100.

Moreover, the first spring 110 and the second spring 120 provide redundancy within the spring assembly 100. More particularly, in the case of the failure of one of the first spring 110 or the second spring 120, the other of the first spring 110 or the second spring 120 may support the load force F. In this way, vehicles 10 (FIG. 1) including spring assemblies 100 with both the first spring 110 and the second spring 120 may continue operation in the case of failure of one of the first spring 110 and the second spring 120, allowing the vehicle 10 (FIG. 1) to be driven to a service station without requiring towing.

In some embodiments and referring to FIG. 4, the spring assembly 100 may include an optional jounce bumper 170 positioned on an end component 140 of a spring assembly 100. The jounce bumper 170 may absorb impacts and dampen noise, and may prevent the spring assembly 100 from fully compacting during shock impacts, for example in the case the vehicle 10 impacts a pothole or the like. However, in some embodiments, the jounce bumper 170 may be omitted, for example, in embodiments that include both the first spring 110 and the second spring 120. In particular, the first spring 110 and the second spring 120 may be tuned to prevent the spring assembly 100 from fully compacting, and the first spring 110 and the second spring 120 may be tuned to reduce noise, vibration, and harshness that would conventionally be absorbed by the jounce bumper 170.

Moreover, in embodiments that include the first spring 110 and the second spring 120, conventional internal rebound springs may be omitted from the spring assembly 100, thereby, decreasing the cost and weight of the spring assembly 100 as compared to conventional air springs.

Figure 5:
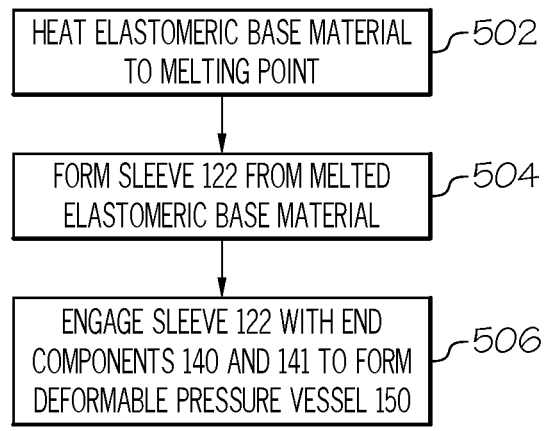
FIG. 5 schematically depicts a flowchart of an example method for making an air spring, according to one or more embodiments shown and described herein.

Referring to FIGS. 3, 4, and 5, a flowchart of an example method for forming an air spring, for example the second spring 120, is depicted. In a first block 502, an elastomeric base material is heated to a melting point of the elastomeric base material. At block 504, the sleeve 122 is formed from the melted elastomeric base material, the sleeve 122 being substantially free of textile reinforcing fibers. At block 506, the sleeve 122 is engaged with end components 140 and 141 to define the deformable pressure vessel 150.

As noted above, the air spring (e.g., the second spring 120) may be utilized alone, or may be positioned in parallel with the first spring 110.

Figure 6:
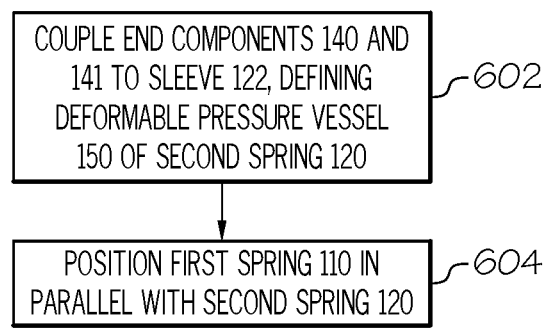
FIG. 6 schematically depicts another flowchart of an example method for making a composite spring assembly, according to one or more embodiments shown and described herein.

In particular, and referring to FIGS. 3, 4, and 6, a flowchart of an example method for forming a composite spring assembly, such as spring assembly 100, is depicted. In a first block 602, the end components 140 and 141 are coupled to the sleeve 122, the end components 140 and 141 and the sleeve 122 defining the deformable pressure vessel 150 of the second spring 120. At block 604, the first spring 110 and the second spring 120 are positioned in parallel. As noted above, the second spring 120 is structurally configured to deform according to Boyle's law, and the first spring 110 is structurally configured to deform according to Hooke's law.

Accordingly, it should now be understood that embodiments of the present disclosure are directed to spring assemblies including air springs. In some embodiments, the air springs may be substantially free of textile reinforcing fibers, thereby decreasing the cost of manufacturing the air spring as well as increasing the durability and performance of the air spring. In some embodiments, the air springs are positioned in parallel with a spring that deforms in accordance with Hooke's law. In these embodiments, pressures within the air spring can be reduced, and the air spring and Hooke's law spring may provide redundancy in the case of the failure of one of the air spring or the Hooke's law spring.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method for forming an air spring for a non-rail wheeled or tracked vehicle comprising a frame coupled to the air spring, the method comprising:
heating an elastomeric base material to a melting point of the elastomeric base material, thereby forming a melted elastomeric base material;
forming a sleeve from thermoplastic including the melted elastomeric base material; and
engaging the sleeve with end components, the sleeve and the end components defining a deformable pressure vessel, wherein the deformable pressure vessel supplies a supporting force,
wherein sealing the sleeve to the end components comprises co-molding or welding the sleeve to the end components.

2. The method of claim 1, wherein forming the sleeve comprises at least one of injection molding, blow molding, insert molding, and spin molding the sleeve.

3. The method of claim 1, wherein forming the sleeve comprises extruding the sleeve.

4. The method of claim 1, wherein co-molding the sleeve to the end components comprises bonding the sleeve to the end components such that the end components and the sleeve are monolithic.

5. The method of claim 1, wherein sealing the sleeve to the end components comprises welding the sleeve to the end components.

6. The method of claim 1, wherein sealing the sleeve to the end components comprises mechanically coupling or chemically coupling the sleeve to the end components.

7. The method of claim 1, further comprising positioning a first spring within the deformable pressure vessel.

8. The method of claim 7, wherein the first spring is structurally configured to deform according to Hooke's law.

9. The method of claim 1, further comprising positioning a first spring around the deformable pressure vessel.

10. The method of claim 9, wherein the first spring is structurally configured to deform according to Hooke's law.

11. The composite spring assembly of claim 1, wherein the sleeve is free of textile reinforcing fibers.

12. The composite spring assembly of claim 1, wherein the sleeve includes textile reinforcing fibers.

13. A composite spring assembly for a non-rail wheeled or tracked vehicle, the composite spring assembly comprising:
a first spring that is structurally configured to deform according to Hooke's law, and wherein the first spring comprises a wave spring;
a second spring that is structurally configured to deform according to Boyle's law, wherein the second spring is positioned in parallel with the first spring, and wherein the second spring comprises:
a sleeve; and
end components engaged with the sleeve, the sleeve and the end components defining a deformable pressure vessel.

14. The composite spring assembly of claim 13, wherein the first spring supports a portion of the total load applied to the composite spring assembly.

15. The composite spring assembly of claim 13, wherein the first spring is positioned within the second spring.

16. The composite spring assembly of claim 13, wherein the first spring is positioned around the second spring.

17. The composite spring assembly of claim 13, wherein the first spring is formed of a non-metallic material.

18. The composite spring assembly of claim 13, wherein the first spring is formed of a metallic material.

19. The composite spring assembly of claim 13, wherein the second spring is free of textile reinforcing fibers.

20. A method for forming a composite spring assembly for a non-rail wheeled or tracked vehicle, the method comprising:
coupling end components to a sleeve formed from thermoplastic, the end components and the sleeve defining a deformable pressure vessel of a second spring; and
positioning a first spring and the second spring in parallel, wherein the first spring is structurally configured to deform according to Hooke's law and the second spring is structurally configured to deform according to Boyle's law,
wherein coupling the end components to the sleeve comprises co-molding or welding the sleeve to the end components.

21. The method of claim 20, further comprising:
heating an elastomeric base material to a melting point of the elastomeric base material, thereby forming a melted elastomeric base material; and
forming the sleeve from the melted elastomeric base material.

22. The method of claim 21, wherein the deformable pressure vessel is free of textile reinforcing fibers.

23. The method of claim 20, wherein the thickness of sleeve can vary along the length and circumference by design.

* * * * *